United States Patent [19]

Hamanishi et al.

[11] Patent Number: 4,796,045
[45] Date of Patent: Jan. 3, 1989

[54] PHOTO-TAKING LENS ASSEMBLY HAVING AN AUTOMATICALLY AND MANUALLY MOVABLE LENS

[75] Inventors: Yoshinari Hamanishi, Tokyo; Yoshiharu Shiokama; Hitoshi Imanari, both of Kawasaki; Sachio Ohmori, Yokosuka, all of Japan

[73] Assignee: Nikon Corporation, Tokyo, Japan

[21] Appl. No.: 170,072

[22] Filed: Mar. 15, 1988

Related U.S. Application Data

[63] Continuation of Ser. No. 46,701, May 7, 1987, abandoned.

[30] Foreign Application Priority Data

May 9, 1986 [JP] Japan ............................... 61-106083
Mar. 16, 1987 [JP] Japan ............................... 62-60858

[51] Int. Cl.$^4$ ............................................. G03B 3/00
[52] U.S. Cl. .................................... 354/400; 354/195.1
[58] Field of Search ........... 354/195.1, 195.11, 195.12, 354/195.13, 400, 402

[56] References Cited

U.S. PATENT DOCUMENTS

| | | |
|---|---|---|
| 4,272,174 | 6/1981 | Terramoto et al. ............... 354/195.1 |
| 4,309,077 | 1/1982 | Tomori ............................. 354/195.1 |
| 4,413,894 | 11/1983 | Miki et al. ...................... 354/195.12 |
| 4,416,513 | 11/1983 | Vesugi ............................. 354/195.1 |
| 4,456,356 | 6/1984 | Okabe ............................. 354/195.13 |

*Primary Examiner*—Russell E. Adams
*Attorney, Agent, or Firm*—Shapiro and Shapiro

[57] ABSTRACT

A photo-taking lens assembly having a movable lens movable in the direction of the optic axis thereof comprises electric moving means including an electric rotating member electrically rotatively driven to move the movable lens, manual moving means including a manually operable member extraneously manually operable to move the movable lens, and means for combining the amounts of movement of the movable lens by the electric moving means and the manual moving means during the operation of the electric rotating member and the manually operable member.

32 Claims, 5 Drawing Sheets

PHOTO-TAKING LENS ASSEMBLY HAVING AN AUTOMATICALLY AND MANUALLY MOVABLE LENS

This is a continuation application of Ser. No. 046,701 filed May 7, 1987, now abandoned.

BACKGROUND OF THE INVENTION

1. Field of the Invention

This invention relates to a photo-taking lens assembly in which a lens is automatically and manually movable, and in particular to a photo-taking lens assembly having an automatically and manually movable lens which is suitable for use with cameras capable of automatic focusing or the like.

2. Related Background Art

In a so-called TTL type automatic focusing apparatus wherein the in-focus state by light passed through a photo-taking lens is detected and a drive motor is controlled on the basis of the detection signal to thereby accomplish focus adjustment, focus detection may sometimes become impossible if the image of an object to be photographed is dark or too blurred and low in contrast. In such a state in which focus detection is impossible, it becomes impossible to automatically accomplish focus adjustment and therefore, various proposals for an automatic focusing apparatus also capable of manual focusing have heretofore been made and already are known. These known focusing apparatuses are divided broadly into the type as disclosed, for example, in Japanese Laid-Open patent application No. 73025/1980 wherein automatic focusing and manual focusing are selectively changed over by change-over means, and the type as disclosed, for example, in Japanese Laid-Open patent application No. 114008/1983 wherein a lens different from a movable lens for manual distance adjustment is moved to accomplish automatic focusing.

However, in the former prior art, the operation of using the change-over means has been cumbersome and quick change-over could not be accomplished. Also, even if the photographing conditions for the object to be photographed change during manual focusing to bring about a state in which automatic focusing is possible, as long as the photographer is not aware of it, focus adjustment must be effected manually, and this leads to a disadvantage that the function of a camera with an automatic focusing apparatus cannot be sufficiently performed. Also, in an apparatus wherein the range of movement of the movable lens for focusing is great, the time required for focusing becomes long or short depending on the initial position of the movable lens group and further, where the weight of the movable lens group is great, the speed of movement of the lens is low, and this has impaired quickness of photographing.

The latter known focusing apparatus has an advantage that automatic focusing and manual focusing can be accomplished without interfering with each other and the change-over device for automatic focusing and manual focusing is not required, while it suffers from a disadvantage that the construction of the optical system is complicated. In an apparatus wherein a teleconverter for automatic focusing is added to the interchangeable lens as in the embodiment of the aforementioned Japanese Laid-Open patent application No. 114008/1983, the teleconverter is designed to be versatilely used for various interchangeable lenses, and this leads to the following problems. That is, the above-mentioned teleconverter for automatic focusing has suffered from the following disadvantages:

(1) The combined F-number of the interchangeable lens and the teleconverter always becomes greater than the F-number of the interchangeable lens itself and the photo-taking lens is a substantially dark lens.

(2) If there are aberrations in the interchangeable lens, the aberrations tend to be amplified by the teleconverter and the composite imaging performance deteriorates.

(3) Further, when focusing has been effected by only the teleconverter, the range of focusing from infinity to a close distance is narrow and fluctuations of the aberrations are relatively great.

SUMMARY OF THE INVENTION

It is therefore an object of the present invention to solve such problems peculiar to the prior art and to provide a photo-taking lens assembly in which the change-over of the automatic and manual driving of a movable optical system can be accomplished quickly and which is good in operability.

It is another object of the present invention to provide a photo-taking lens assembly capable of automatic and manual focusing in which automatic and manual focusing is possible without change-over and which is easy to operate and permits focusing to be accomplished quickly and highly accurately even if the movement distance of the lens is long and which can give full play to the excellent imaging performance of the lens.

To achieve the above objects, a photo-taking lens assembly in accordance with the present invention includes electric moving means including an electric rotating member electrically rotatively driven to move a movable lens in the direction of the optic axis thereof, manual moving means including a manually operable member extraneously manually operated to move said movable lens, and means for combining the amounts of movement of the lens by said electric moving means and said manual moving means during the operation of said electric rotating member and said manually operable member. The speed of movement of the movable lens by said electric moving means is designed to be controlled by said manual moving means through said combining means.

As the combining means, use is made of a differential gear mechanism utilizing a planet gear or a differential screw mechanism utilizing a double helicoid screw.

According to the present invention constructed as described above, means is provided for combining the amount of displacement of the lens by automatic operation and the amount of displacement of the lens by manual operation and therefore, the speed of movement of the lens during the electric driving can be controlled by a manually operable ring, and the lens can be rapidly moved even if the amount of movement of the lens is great. Also, the energy for bringing the lens close to a predetermined position at a high speed is supplied from the operator's hand during the manual operation and therefore, the consumption of the battery during the electric driving can be mitigated. Further, movement of the lens can be accomplished manually independently of the movement of the lens by the automatic operation and therefore, for example, even in an automatic focusing apparatus wherein focusing is roughly accomplished by automatic focusing, precise focusing can be accomplished manually.

Furthermore, in the photo-taking lens barrel shown in embodiments of the present invention, where automatic focusing is impossible due to the situation of the object to be photographed or where automatic focusing is uncertain, the lens can be quickly operated to the vicinity of the in-focus point by the manual focusing operation simply by operating the manually operable ring even in the course of the automatic focusing drive (that is, without operating a change-over switch for the automatic focusing mode and the manual focusing mode as in the conventional camera system), and if the operation of the manually operable ring is stopped, the automatic focusing drive is automatically restored and the lens can be automatically driven to the in-focus point and therefore, a quick focusing operation can be likewise performed.

Other objects, features and effects of the present invention will become more fully apparent from the following detailed description based on the accompanying drawings.

DESCRIPTION OF THE PREFERRED EMBODIMENTS

Figure 1:
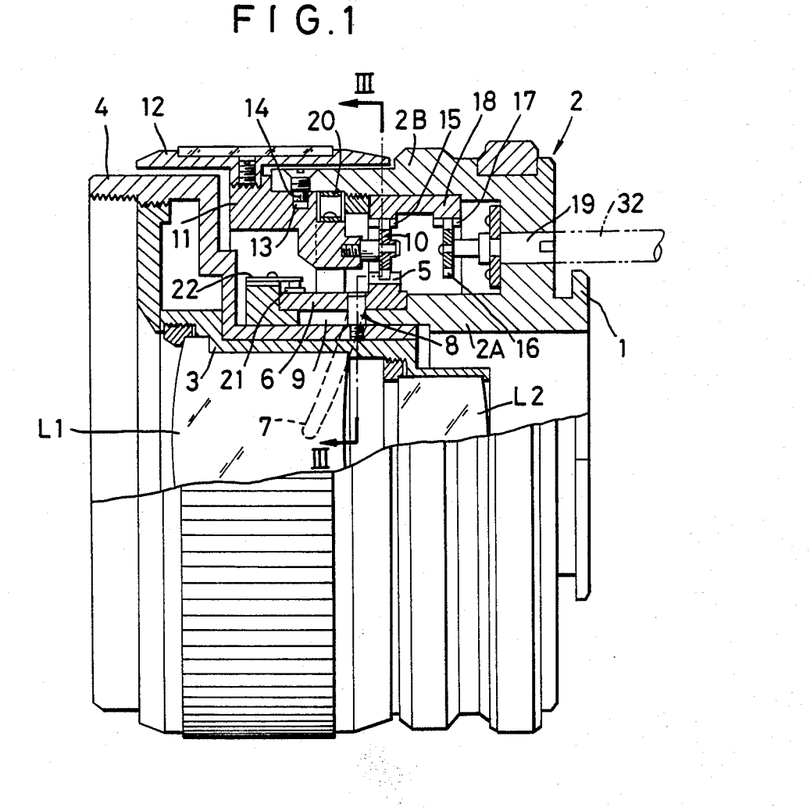
FIG. 1 is a partly broken-away side view of a photo-taking lens barrel showing a first embodiment of the present invention.
Figure 2:
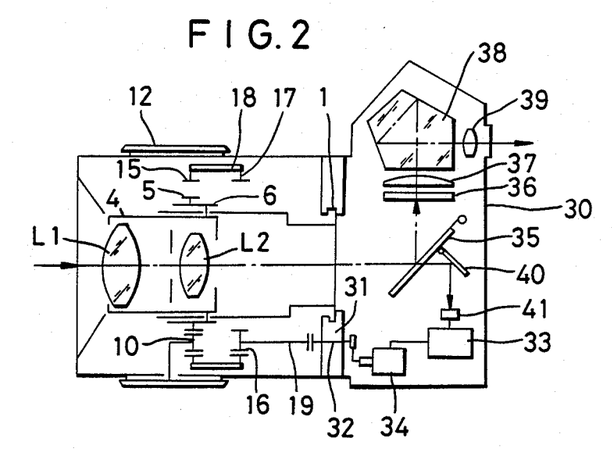
FIG. 2 schematically illustrates a state in which the photo-taking lens barrel shown in FIG. 1 has been mounted to a single lens reflex camera having a TTL type automatic in-focus detecting apparatus.

FIGS. 1 and 2 show a first embodiment of the present invention.

Referring to FIG. 1, a fixed cylinder 2 having a bayonet pawl 1 for the coupling to a camera body is comprised of an inner cylinder portion 2A and an outer cylinder portion 2B. A rectilinearly movable cylinder 4 for supporting a lens holding cylinder 3 for holding the movable lenses L1 and L2 of a photo-taking optical system is provided on the inner periphery of the inner cylinder portion 2A so as to be slidable in the direction of the optic axis. A cam cylinder 6 having an external gear 5 which constitutes a part of a differential gear mechanism to be described in detail is rotatably fitted to the outer periphery of the inner cylinder portion 2A. The cam cylinder 6 is formed with a cam slot 7, which is engaged by a sliding pin 8 studded on the rectilinearly movable cylinder 4 and extending through a rectilinear guide slot 9 provided in the inner cylinder portion 2A and elongated in the direction of the optic axis.

A manually rotatable cylinder 11 for supporting a planet gear 10 meshing with the external gear 5 is rotatably supported on the inner peripheral end of the outer cylinder portion 2B of the fixed cylinder 2. The manually rotatable cylinder 11 is integrally coupled to a manually operated focusing ring 12 and has its movement in the direction of the optic axis checked by an engaging pin 14 inserted in a circumferential groove 13 formed in the outer periphery of the manually rotatable cylinder 11.

Figure 3:
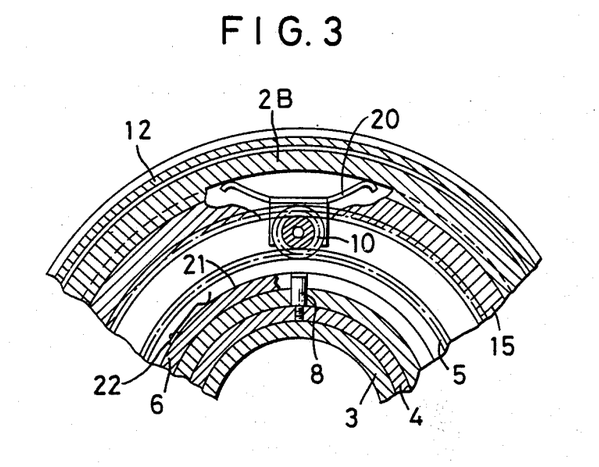
FIG. 3 is a cross-sectional view taken along line III—III of FIG. 1.

Further, an internal gear cylinder 18, in which an internal gear 15 meshing with the planet gear 10 and an internal gear 17 meshing with a pinion gear 16 for automatic focusing are provided integrally with each other, is rotatably provided on the inner periphery of the outer cylinder portion 2B of the fixed cylinder 2. The pinion gear 16 for automatic focusing is integrally secured to a lens side drive shaft 19 extending through the side surface of the fixed cylinder 2. A friction brake spring 20, which is in contact with the inner periphery of the outer cylinder portion 2B of the fixed cylinder 2 so as to press the latter, is secured to the manually rotatable cylinder 11, as shown in FIG. 3, and a brush 22 which is in contact with a lens position detecting sliding resistor 21 provided in the cam cylinder 6 is secured to one end of the inner cylinder portion 2A of the fixed cylinder 2.

In FIG. 2, when a photo-taking lens is mounted on the lens mount 31 of the camera body 30 through the intermediary of the bayonet pawl 1 provided on the fixed cylinder 2 of the photo-taking lens barrel, the lens side drive shaft 19 is coupled to a camera body side coupling shaft 32. The coupling shaft 32 is rotatively driven by a motor 34 controlled by the detection signal of a focus detecting circuit 33. The light from an object to be photographed passed through the lenses L1 and L2 of the photo-taking optical system is partly reflected by a movable mirror 35 and forms an object image on a focusing screen 36. The object image may be observed through a condenser lens 37, a pentaprism 38 and a finder eyepiece 39. Some of the light transmitted through a half-mirror portion provided in the central portion of a movable mirror 35 is reflected by a submirror 40 and is imaged on the light-receiving surfaces of a pair of light-receiving devices 41 including an imaging lens. A signal photoelectrically converted by the light-receiving devices 41 is supplied to the focus detecting circuit 33, and a motor 34 is drive-controlled by a control signal from the focus detecting circuit 33 output in accordance with the imaging condition (front focus, rear focus or in-focus).

The focusing operation in the above-described first embodiment will now be explained.

When the lens side drive shaft 19 is rotated by the drive of the motor 34 controlled in accordance wth the imaging condition of the movable lenses L1 and L2 of the photo-taking optical system, the pinion gear 16 which is integral with the drive shaft 19 is rotated. The rotation of the pinion gear 16 is transmitted through one internal gear 17 of the internal gear cylinder 18 to the other internal gear 15, which is thus rotated about the optic axis. The rotation of the internal gear 15 causes rotation of the planet gear 10. In the case of automatic focusing only, the rotation of the manually rotatable cylinder 11 which supports the planet gear 10 is checked by the friction force of the friction brake spring 20 and therefore, the rotation of the planet gear 10 causes rotation of the cam cylinder 6 having the outer gear 5 meshing therewith.

When focusing is to be effected from a long distance to a short distance, clockwise rotation of the internal gear 15 as viewed in FIG. 3 causes the cam cylinder 6 to be rotated counter-clockwise with the external gear 5. By the rotation of the cam cylinder 6, the sliding pin engaged with the cam slot 7 is guided in the rectilinear guide slot 9 and moved leftwardly as viewed in FIG. 1, thereby displacing the rectilinearly movement cylinder 4 to the left. Thereby the movable lenses L1 and L2 are moved leftwardly with the lens holding cylinder 3 as viewed in FIG. 1, whereby focus adjustment is automatically accomplished from infinity to a close distance. Conversely, when automatic focusing is to be effected from a close distance to a long distance, reverse rotation of the pinion gear 16 causes counter-clockwise rotation of the internal gear 15 as viewed in FIG. 3 and the cam cylinder 6 is rotated clockwise with the internal gear 5. Thereby the rectilinearly movable cylinder 4 is moved rightwardly, whereby automatic focusing to a long distance is accomplished. The differential gear mechanism comprising the external gear 5, the planet gear 10 and the internal gear 15 constitutes lens displacement amount combining means.

When the manually operated focusing ring 12 is rotated in the course of the automatic focusing by the above-described motor drive, the planet gear 10 revolves about the optic axis while rotating and increases or decreases the rotational speed of the cam cylinder 6 with the external gear 5. Thereby, with the rectilinearly movable cylinder 4, the automatic focusing speed of the movable lenses L1 and L2 of the photo-taking optical system can be increased, and also can be slowed down as required.

Control of the automatic focusing speed of the manual focusing operation, that is, a change in the rotational speed of the cam cylinder 6, i.e., the rotational speed of the external gear 5, will now be described in detail with reference to FIG. 3. In the automatic focusing, when the pinion gear 16 is rotated through the intermediary of the drive shaft 19 and the internal gear 15 constituting a part of the differential gear mechanism is rotated clockwise, the rotation is transmitted to the external gear 5 through the planet gear 10 in a state in which the manually operated focusing ring 12 is fixed, and thus the external gear 5 is rotated counter-clockwise. The counter-clockwise rotation of the external gear 5 causes the movable lenses L1 and L2 to be moved forward along the optic axis (moved leftwardly as viewed in FIG. 1). When the manually operated focusing ring 12 is now rotated in the direction opposite to the direction of rotation of the internal gear 15, i.e., the counter-clockwise direction as viewed in FIG. 3, the external gear 5 is rotated counter-clockwise at a speed higher than the speed during automatic focusing in conformity with the rotational speed of the manually operated focusing ring 12. Accordingly, the movable lenses L1 and L2 can be moved forward at a speed higher than that during automatic focusing. Likewise, if the manually operated focusing ring 12 is turned clockwise while the movable lenses L1 and L2 are being moved backward (rightwardly as viewed in FIG. 1) by automatic focusing, that is, while the internal gear 15 is being rotated counter-clockwise as viewed in FIG. 3, the movable lenses L1 and L2 can be moved backward at a further higher speed.

Accordingly, when the movable lenses L1 and L2 are to be greatly moved, for example, from the infinity position to the close distance position, the manually operated focusing ring 12 is rotated during the automatic focusing operation and manual focusing is effected until the object image appears on the focusing screen 36 through the finder eyepiece 39 and, if the rotation of the manually operated focusing ring 12 is stopped at that position, the automatic focusing operation will thereafter be continuedly effected until a clear image is obtained. Where the rotation of the manually operated focusing ring 12 is to be stopped to effect automatic focusing, if the manually operated focusing ring 12 is rotated reversely, the rotational speed of the cam cylinder 6 in the automatic in-focus state can be slowed down and therefore, it is possible to accomplish a precise focusing operation smoothly.

The amounts of movement of the movable lenses L1 and L2 during said focusing are determined by the angle of rotation of the cam cylinder 6, and an in-focus distance (object distance) signal corresponding to the positions of the movable lenses L1 and L2 and the resistance value of the sliding resistor 21 which is in contact with the brush 22 is supplied to the focus detecting circuit 33 (see FIG. 2). At the same time, said signal is transmitted to a distance display device, not shown, which is provided in the finder field of view, and the then object distance or distance mark is displayed in the finder field of view.

Figure 4:
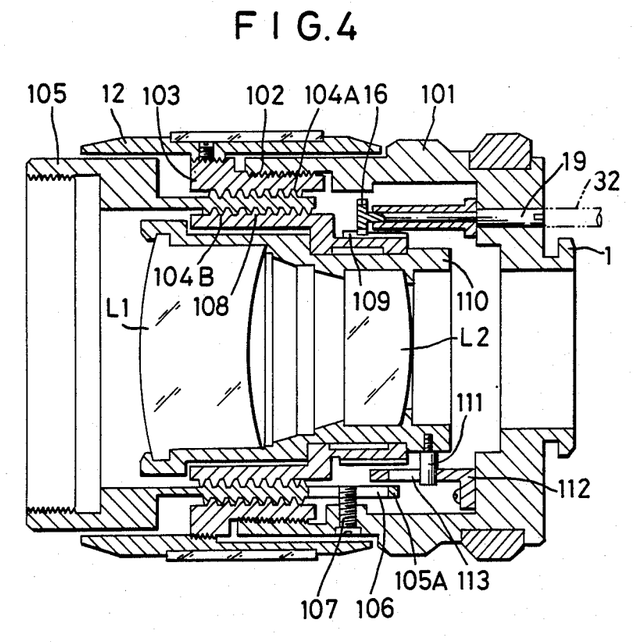
FIG. 4 is a longitudinal cross-sectional view showing a second embodiment of the present invention.

FIG. 4 is a cross-sectional view of a photo-taking lens barrel showing a second embodiment of the present invention. In this embodiment, a helicoid screw is used instead of the differential gear mechanism in FIG. 1. Members functionally similar to those in the embodiment of FIG. 1 are given similar reference numerals, and the detailed constructions thereof need not be described.

Referring to FIG. 4, a manually operated focusing ring 12 is secured to a rotatable cylinder 103 threadably engaged with a thread 102 formed on a fixed cylinder 101 having a bayonet pawl 1. The rotatable cylinder 103 threadably supports a rectilinearly movable cylinder 105 through a helicoid screw 104A. A movable rectilinear guide slot 106 extending in the direction of the optic axis is formed in a protruded portion 105A formed at the right end of the rectilinearly movable cylinder 105 as viewed in FIG. 4, and a guide pin 107 studded on the fixed cylinder 101 is engaged with the movable rectilinear guide slot 106. A helicoid cylinder 108 is threadably engaged with the inner periphery of the rectilinearly movable cylinder 105 through a helicoid screw 104B.

A pinion gear 16 integrally secured to a lens side drive shaft 19 is in meshing engagement with a spur gear of great tooth width formed on the outer periphery of the right end portion of the helicoid cylinder 108 as viewed in FIG. 4. A lens holding cylinder 110 for holding movable lenses L1 and L2 is fitted to and supported on the inner periphery of the helicoid cylinder 108, and a sliding pin 111 studded on the outer periphery of the right end portion of the lens holding cylinder 110 is engaged with a fixed rectilinear guide slot 113 in a guide member 112 protruding in the direction of the optic axis and secured to the interior of the fixed cylinder 101. The fixed rectilinear guide slot 113 elongated in the direction of the optic axis is formed to a length which limits the movement of the movable lenses L1 and L2 to the infinity position to a predetermined close distance position through the sliding pin 111. The movable rectilinear guide slot 106 is formed to a length twice or more as great as the length of the fixed rectilinear guide slot 113 so that the amount of movement of the rectilinearly movable cylinder 15 may be at least twice the amount of movement of the movable lenses L1 and L2. A double helicoid mechanism (104A, 104B) provided in the rectilinearly movable cylinder 15 constitutes lens displacement amount combining means.

Operation of the second embodiment shown in FIG. 4 will now be described. In FIG. 4, the sliding pin 111 is positioned at the right end of the fixed rectilinear guide slot 113, the movable lenses L1 and L2 lie at the infinity position, and the guide pin 107 is positioned in the central portion of the movable rectilinear guide slot 106. When the movable lenses L1 and L2 are to be moved from the infinity position by automatic focusing, the helicoid cylinder 108 is rotated by rotation of the pinion gear 16 through the spur gear 109. This helicoid cylinder 108 is moved in the direction of the optic axis while being rotated by the helicoid screw 104B. Since the lens holding cylinder 110 supported by the helicoid cylinder 108 is prevented from rotating by the engagement between the sliding pin 111 and the fixed rectilinear guide slot 113, it is moved only in the direction of the optic axis in response to the rotation of the helicoid cylinder 108 to move the movable lenses L1 and L2 leftwardly along the optic axis as viewed in FIG. 4, thereby accomplishing automatic focusing. At that time, the rectilinearly movable cylinder 105 threadably engaged with the helicoid screw 104B is prevented from rotating by the guide pin 107 studded on the fixed cylinder 101 and is therefore placed in its stopped state and thus, the manually operated focusing ring 12 is not rotated.

On the other hand, when the manually operated focusing ring 12 is rotated, the rotatable cylinder integral therewith is rotated and is slightly moved in the direction of the optic axis while being rotated in accordance with the small pitch of the screw 102. Even if the rotatable cylinder 103 is rotated, the rectilinearly movable cylinder 105 does not rotate because it is prevented from rotating by the guide pin 107, and rectilinearly moves in the direction of the optic axis in accordance with the lead of the helicoid screw 104A. Accordingly, the helicoid cylinder 108 threadably engaged with the rectilinearly movable cylinder 105 through the other helicoid screw 104B is moved in the direction of the optic axis with the rectilinearly movable cylinder 105, thereby displacing the movable lenses L1 and L2 in the direction of the optic axis with the lens holding cylinder 110. In this case, the lens movement by the manual operation and the lens movement by the automatic focusing can be accomplished independently of each other and therefore, by operating the manually operated focusing ring 12 during the automatic focusing operation, the amounts of lens movement by the automatic focusing and the manual focusing can be combined and the feeding of the lenses becomes possible, and the movable lenses L1 and L2 can be brought close to the in-focus position on the spot.

When in the infinity in-focus state of FIG. 4, for example, the power source of the focus detecting circuit 33 (see FIG. 2) is disconnected or that power source is consumed and the motor 34 is not driven, focusing to a close distance must be made possible by only the manually operated focusing ring 12. For that purpose, the manually operated focusing ring 12 is rotated and the rectilinearly movable cylinder 105 is moved leftwardly until the sliding pin 111 bears against the left end of the fixed rectilinear guide slot 113. At that time, the right end of the movable rectilinear guide slot 106 comes close to the guide pin 107. Also, in a state in which the movable lenses are focused to the close distance position by only the automatic focusing, that is, in a state in which the sliding pin 111 bears against the left end of the fixed rectilinear guide slot 113, when the movable lenses L1 and L2 are to be focused to infinity by only the operation of the manually operated focusing ring 12, the rectilinearly movable cylinder 105 is moved rightwardly, whereby the sliding pin 111 bears against the right end of the fixed rectilinear guide slot 113, whereupon the left end of the movable rectilinear guide slot 106 comes close to the guide pin 107. That is, if the length of the movable rectilinear guide slot 113 is formed at least twice the length of the fixed rectilinear guide slot 113, automatic focusing and manual focusing can be accomplished from infinity to a close distance without interfering with each other, and also during the automatic focusing operation, the movable lenses L1 and L2 can be quickly moved to the vicinity of the in-focus position by a manual operation and finally, focusing can be accurately accomplished by automatic focusing, and at that time, no special changing-over operation is required, and this leads to very simple handling.

In the first embodiment shown in FIG. 1 and the second embodiment shown in FIG. 4, the design is such that the entire optical system constituting the photo-taking lens is moved as a unit in the direction of the optic axis to thereby accomplish focusing, but of course, the present invention is also applicable to a photo-taking lens in which, as in the case of a zoom lens, the foremost focusing lens or some lens in the lens system is moved to accomplish focusing. Also, in the first embodiment shown in FIG. 1, the design is such that the internal gear 15 of the differential gear mechanism is rotated by the pinion gear 16 included in automatic lens displacing means and the planet gear 10 is revolved by the manually operated focusing ring 12 included in manual lens displacing means, but alternatively, the design may be such that the revolution of the planet gear 10 is effected by rotation of the pinion gear 16 and the rotation of the internal gear 15 is effected by the manually operated focusing ring 12.

In a camera or a lens system adopting an automatic focus detecting device capable of being focused in real time, no limitation occurs in the giving and taking of in-focus signals when the manual focusing and the automatic focusing are operated at the same time as described above. However, where a charge accumulation type photoelectric sensor such as CCD is used in the automatic focus detecting device, occurrence of a time lag in the judgment of automatic focusing cannot be avoided. Therefore, a signal from the lens for temporarily stopping the automatic focusing is necessary for the prevention of hunting when manual focusing is started while the automatic focusing is being effected. For this purpose, such a signal that again starts the charge accumulation of the photoelectric sensor of the automatic focus detecting device after the manual focusing has been terminated may be automatically output from the lens side. Thereby, the manual focusing and the automatic focusing are smoothly associated with each other and accurate focusing can be quickly realized without causing hunting. By effecting such control, photographing can be accomplished by a lens for automatic focusing as if the manual focusing and the automatic focusing were operating macroscopically at the same time.

If in the above-described embodiments, rough movement for focusing is effected by manual focusing means and fine movement for focusing is effected by automatic focusing means, focusing of very high accuracy can be achieved at a high speed by the combination of the manual and automatic operations.

Figure 5:
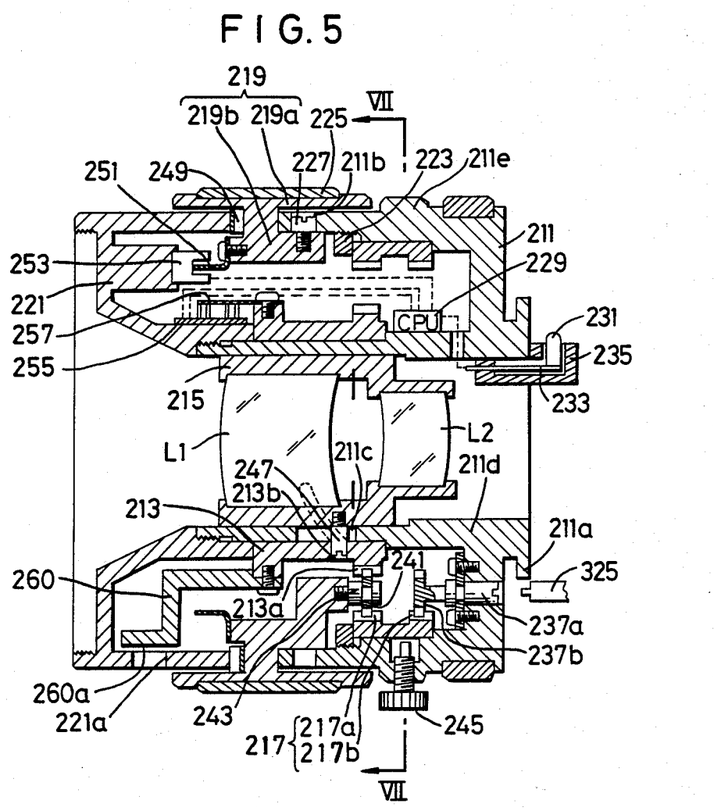
FIG. 5 is a longitudinal cross-sectional view of a photo-taking lens barrel showing a third embodiment of the present invention.

FIG. 5 is a cross-sectional view of a photo-taking lens barrel capable of automatic and manual focusing according to a third embodiment of the present invention. The photo-taking lens barrel A is mountable to a camera B having an automatic focus detecting device shown in FIG. 6, and the movable lenses L1 and L2 of a photo-taking optical system may be driven by a motor 313 for automatic focusing on the camera side during automatic focusing photography.

In FIG. 5, a fixed cylinder 211 having a bayonet pawl 211a for mounting the photo-taking lens barrel to the camera body B is comprised of an inner cylinder portion 211d and an outer cylinder portion 211e, and a rectilinearly movable cylinder 215 holding the movable lenses L1 and L2 of the photo-taking optical system is fitted to the inner periphery of the inner cylinder portion 211d. A cam cylinder 213 having an external gear 213a constituting a part of a differential gear mechanism to be described in detail is rotatably fitted to the outer periphery of the inner cylinder portion 211d.

A sliding pin 247 studded on the rectilinearly movable cylinder 215 and extending through a rectilinear guide slot 211c formed in the inner cylinder portion 211d of the fixed cylinder 211 and elongated in the direction of the optic axis is engaged with a cam slot 213b formed in the cam cylinder 213. As a result, rotation of the cam cylinder 213 causes the rectilinearly movable cylinder 215 to be moved along the optic axis with the movable lenses L1 and L2. A distance scale cylinder 260 is secured to the fore end portion of the cam cylinder 213 so that a distance scale provided on the outer peripheral surface 260a thereof can be read through a distance display window 221a formed in a forward fixed cylinder 221. In the photo-taking lens according to the prior art, it has been usual to provide a set distance scale on a manually operated member, but in the case of the third embodiment, the position of a manually operated ring 219a and the positions of the movable lenses L1 and L2 are not correlated with each other and therefore, the distance scale cannot be provided on the manually operated ring 219a. So, a distance scale cylinder 260 is secured to the fore end of the cam cylinder 213 rotatable with a correlation with the movement of the movable lenses L1 and L2, and a distance scale is provided on the outer peripheral surface 260a of the distance scale cylinder 260 so that the distance scale may be read through the distance display window 221a provided in the forward fixed cylinder 221.

A manually rotatable cylinder 219 is fitted to and supported by the fore end (the left end as viewed in FIG. 5) of the outer cylinder portion 211e of the fixed cylinder 211. The manually rotatable cylinder 219 is comprised of a manually operable ring 219a which may be extraneously operated and a rotatable cylinder 219b which is operatively associated with other barrel. A pin 227 engaged with a circumferential slot 211b formed in the outer cylinder portion 211e of the fixed cylinder 211 is studded on the rotatable cylinder 219b and therefore, the manually rotatable cylinder 219 is fitted to and supported by the outer cylinder portion 211e so as to be only rotatable by the guide of the circumferential slot 211b and the pin 227. The manually operable ring 219a has an anti-slippage rubber ring 225 attached to the outer periphery thereof, and a planet gear 241 constituting a part of a differential gear mechanism to be described is supported on the rear end of the rotatable cylinder 219b by a shaft 243.

An internal gear cylinder 217 in which a first internal gear 217a meshing with the planet gear 241 and a second internal gear 217b meshing with a pinion gear 237b formed on one end of a coupling shaft 237a rotatable by a motor drive force (the drive force of the motor 313 of FIG. 6) are provided integrally with each other is rotatably supported on the inner periphery of the outer cylinder portion 211e of the fixed cylinder 211. A wave spring washer 249 for friction braking is sandwiched between the manually rotatable cylinder 219 and a forward fixed cylinder 221 fixed to the fixed cylinder 211, and rotation of the manually rotatable cylinder 219 may be suitably friction-braked by the friction force of the wave spring washer 249.

The forward fixed cylinder 221 has fixed thereto a photointerrupter 253 and a circumferentially elongated flexible printed substrate 255 formed with an encoder pattern (hereinafter referred to as the encoder 255).

The photointerrupter 253 has a light-emitting portion and a light-receiving portion, and a cylindrically-shaped code plate 251 (having light-transmitting holes provided circumferentially at predetermined intervals) fixed to the fore end of the rotatable cylinder 219b of the manually rotatable cylinder 219 is moved between the light-emitting portion and the light-receiving portion with the rotation of the manually rotatable cylinder 219, whereby the photointerrupter may produce a pulse signal corresponding to the rotation of the manually rotatable cylinder 219, and the pulse signal may be transmitted to CPU 229 in the barrel.

The encoder 255 is formed with a conductor pattern from which a code signal corresponding to the position of a sliding brush 257 fixed to the fore end portion of the cam cylinder 213, i.e., the angular position of the cam cylinder 213, is output by the sliding brush 257 sliding on the surface of the encoder. By this encoder 255, a signal indicative of the infinity position, the close distance position and other position of the movable lenses L1 and L2 is output of the CPU 229 in the barrel.

The CPU 229 in the barrel is connected to a contact pin 231 provided on a lens mount portion having bayonet pawl 211a, through a plate spring 233, and the contact pin 231 and the plate spring 233 are held on the inner peripheral portion of the lens mount by a contact housing 235.

A clamp screw 245 threadably engaged with the fixed cylinder 211 is designed to be capable of pressing upon the outer periphery of the internal gear cylinder 217 when it is screwed in, thereby preventing rotation of the internal gear cylinder 217.

Figure 6:
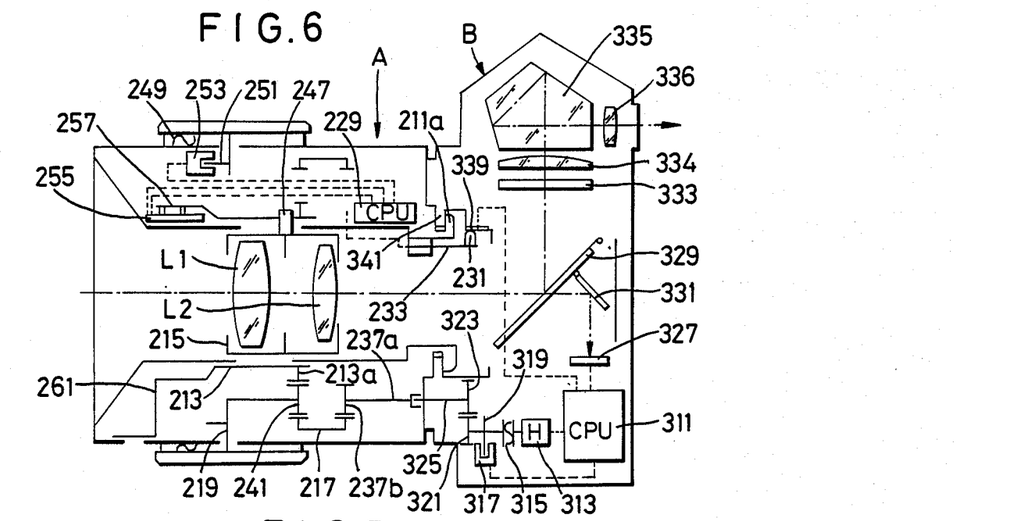
FIG. 6 schematically illustrates a state in which the photo-taking lens barrel shown in FIG. 5 has been mounted to a single lens reflex camera for automatic focusing.

FIG. 6 schematically shows the construction of the system in a state in which the photo-taking lens barrel A according to the third embodiment is mounted to a camera body B.

In FIG. 6, when the photo-taking lens barrel A is mounted on the lens mount 341 of the camera body B through the bayonet pawl 211a provided on the fixed cylinder 211, the coupling shaft 237a of the lens is coupled to the coupling shaft 325 of the camera body. The coupling shaft 325 is rotatively driven by a motor 313 controlled by the drive signal of the CPU (central processing unit) 311 in the body, through a friction clutch 315 and reduction gear trains 321 and 323.

The light from an object to be photographed passed through the movable lenses L1 and L2 of the photo-taking optical system is partly reflected by a movable mirror 329 and forms an object image on a focusing screen 333. The object image may be observed through a condenser lens 334, a pentaprism 335 and a finder eyepiece 336.

Some light transmitted through a half-mirror portion provided in the central portion of the movable mirror 329 is reflected by a sub-mirror 331 and imaged on the light-receiving surfaces of a pair of light-receiving devices (pupil division type automatic focus detecting devices) 327 including an imaging lens. The signal photoelectrically converted by the light-receiving devices 327 is supplied to CPU 311 in the body, whereby the amount of defocus (the amount and direction of deviation of the image surface from a predetermined focal plane) is found in conformity with the imaged state.

The CPU 311 in the body is electrically connected to the CPU 229 in the barrel through the plate spring 233 and contact pin 231 of the contact of the lens side and the contact 339 of the body side, and various types of information regarding the lens can be read out from the ROM in the CPU 229 in the barrel. So, information representative of the amount of movement of the image surface per unit amount of rotation of the coupling shaft 237a is read out and the amount of motor drive necessary for focusing is found from the aforementioned amount of defocus. When the motor drive is started, a pulse signal corresponding to the amount of rotation of the motor shaft is produced by a code plate 319 provided on the motor shaft and a photointerrupter 317 in the body and therefore, at a point of time whereat pulses corresponding to the required amount of motor revolution have been generated, the motor drive is stopped to effect focusing.

When the coupling 237a of the lens side is rotated by the drive of the motor 313 controlled in conformity with the imaging state of the movable lenses L1 and L2 of the photo-taking optical system, the pinion gear 237b which is integral with the coupling shaft 237a is rotated. The rotation of the pinion gear 237b is transmitted to the internal gear cylinder 217 through the second internal gear 217b, and the first internal gear 217a is rotated about the optic axis. This rotation of the first internal gear 217a causes rotation of the planet gear 241. In the case of only automatic focusing, the shaft 243 supporting the planet gear 241 thereon and the manually rotatable cylinder 219 have their rotation checked by the friction force of the wave spring washer 249 for friction braking and therefore, the rotation of the planet gear 241 causes rotation of the cam cylinder 213 having an external gear 213a meshing with the planet gear. To rotate this cam cylinder 213, it is necessary that the rotational torque T1 of the manually rotatable cylinder 219 and the rotational torque T2 of the cam cylinder 213 be set in the relation that $T1 > T2$.

Figure 7:
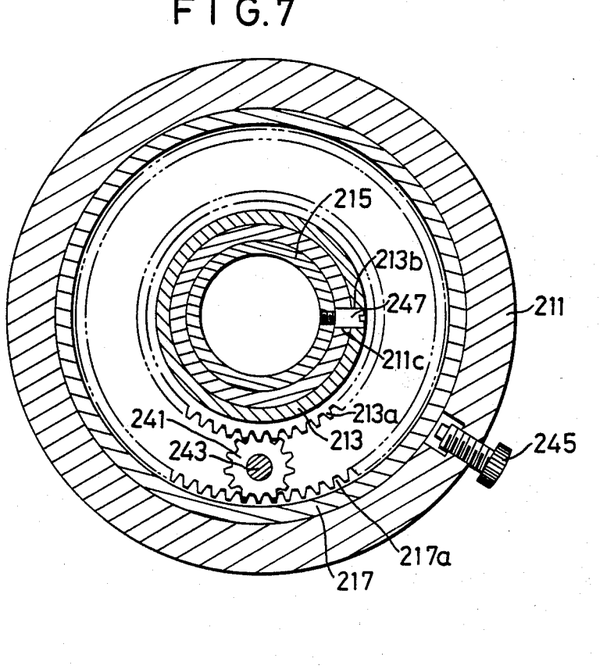
FIG. 7 is a cross-sectional view taken along line VII—VII of FIG. 5.

FIG. 7 is a cross-sectional view of the essential portion of the differential gear mechanism taken along line VII—VII of FIG. 5. Reference is now had to FIG. 7 to describe the action of the differential gear mechanism during the automatic focusing operation.

When automatic focusing is to be effected from a long distance to a short distance, the cam cylinder 213 is rotated clockwise with the external gear 213a by counter-clockwise rotation of the internal gear cylinder 217 as viewed in FIG. 7. The rotation of this cam cylinder 213 causes the sliding pin 247 engaged with the cam slot 213b to be guided and moved leftwardly in the rectilinear guide slot 211c as viewed in FIG. 5, thereby displacing the rectilinearly movable cylinder 215 and the movable lenses L1 and L2 leftwardly. Thereby, focus adjustment is automatically accomplished from infinity to a close distance. Conversely, when automatic focusing is to be effected from a close distance to a long distance, the internal gear 217a is rotated clockwise as viewed in FIG. 7 by reverse rotation of the pinion gear 234b and the cam cylinder 213 is rotated counter-clockwise with the external gear 213a. Thereby the rectilinearly movable cylinder 215 and the movable lenses L1 and L2 are moved rightwardly, whereby automatic focusing to a long distance is accomplished.

The action of the differential gear mechanism when the manual focusing operation is performed in the course of the automatic focusing operation will now be described.

When manual focusing is effected by rotating the manually rotatable cylinder 219 in the course of the automatic focusing operation by said motor drive, there is provided such a structure (i.e., movement amount combining means) that the rotation of the internal gear cylinder 217 by the motor drive, the rotation of the planet gear 241 and the revolution of the planet gear 241 about the optic axis by the manual focusing operation are combined to rotate the cam cylinder 213. In one case the driving of the cam cylinder 213 by the motor drive and the driving of the cam cylinder 213 by the manual operation act at the same time to combine the amounts of movement. In another case only one of the driving of the cam cylinder 213 by the motor drive and the driving of the cam cylinder 213 by the manual operation acts selectively. In the manual focusing operation which does not resort to the motor drive, when the manually rotatable cylinder 219 is rotated, the planet gear 241 revolves about the optic axis while rotating about the shaft 243, thereby rotating the cam cylinder 213 by an amount corresponding to the amount of operation of the manually rotatable cylinder 219 and moving the movable lenses L1 and L2.

Operation of the present embodiment will hereinafter be described in detail.

First, consider a case where during the automatic focusing operation, the movable lenses L1 and L2 have arrived at the limit of the infinity or close distance position. In the case of a popular automatic focusing lens barrel having no differential gear mechanism, when the photo-taking optical system arrives at the limit of the infinity or close distance position, its movement is limited and therefore, the drive shaft of the motor is stopped and the output pulse of the photointerrupter 317 in FIG. 6 is no longer generated, and it can be detected that the photo-taking optical system has arrived at the limit. However, where focusing is effected through the differential mechanism as in the embodiment of FIG. 5, when the photo-taking optical system arrives at the limit of the infinity or close distance position and the cam cylinder 213 has its rotation regulated accordingly, the rotation of the internal gear cylinder 217 by the drive force of the motor 313 causes revolution of the planet gear 241, thereby rotating the manually rotatable cylinder 219 and therefore, the drive shaft of the motor 313 is not stopped, but continues to rotate. Accordingly, the arrival of the optical system at the limit cannot be detected.

So, in the third embodiment of FIG. 5, the encoder 255 for detecting the angular position of rotation of the cam cylinder 213 is provided so that the limit of the infinity and close distance position of the movable lenses L1 and L2 is electrically detected by the encoder 255. That is, when the movable lenses arrive at the limit, a code signal representative of the arrival at the limit is supplied from the encoder 255 to the CPU 229 in the barrel. Then, a signal representative of the arrival of the movable lenses L1 and L2 at the limit is supplied from the CPU 229 in the barrel to the CPU 311 in the body, and the control circuit of the CPU 311 in the body effects the control for reversing or stopping the operation of the drive motor 313.

Now, consider a case where the manual focusing operation is performed during the automatic focusing drive of the movable lenses L1 and L2. A case will hereinafter be described where the aforedescribed movement amount combining means alternatively selects the movement by the automatic focusing operation and the movement by the manual focusing operation.

For example, when during the automatic focusing operation, the contrast of the object to be photographed has become low or the object to be photographed has suddenly moved to thereby increase the amount of defocus, the amount of defocus may sometimes not be obtained even if focus detection is effected. In such a case, it is necessary to perform the focusing operation manually. Thus, it follows that the manual focusing operation is performed during the automatic focusing drive in the state in which the amount of defocus is not obtained, but as in the case of the scanning operation for automatic focusing, there is an inconvenience that during the manual operation, the motor 313 responds and operates independently of the photographer's intention and the photographer cannot accomplish the manual operation as desired.

Also, when the manual focusing operation is performed during the automatic focusing drive in the state in which the amount of defocus has been obtained, the actual amount of movement of the movable lenses L1 and L2 becomes the combined amount of the amount of motor drive and the amount of movement by the manual operation and therefore, the relation between the pulse number of the aforedescribed photointerrupter 317 and the amount of movement of the movable lenses L1 and L2, i.e., the amount of movement of the image surface (the amount of movement on the focusing surface) is destroyed and thus, accurate focusing becomes impossible. So, in the embodiment of FIG. 5, the design is such that it is detected by the photointerrupter 253 that the manually rotatable cylinder 219 has been operated and when the manually rotatable cylinder 219 has been operated, the automatic focusing drive of the photo-taking optical system L1, L2 is stopped.

That is, when the manually rotatable cylinder 219 is operated, a pulse signal is transmitted from the photointerrupter 253 to the CPU 229 in the barrel in response to the rotation of the manually rotatable cylinder 219. The CPU 229 in the barrel determines that the automatic focusing operation is taking place if the photointerrupter 253 generates a predetermined number $\Delta n$ or greater number of pulses within a predetermined time $\Delta t$, and supplies a signal for stopping the motor drive (hereinafter referred to as the servo inhibition flag) to the CPU 311 in the body. If the values of the time $\Delta t$ and the pulse number $\Delta n$ are extremely small, the motor 313 will stop even for slight movement of the manually rotatable cylinder 219 and therefore, when the lens barrel A is to be held for photographing, the touch of the hand with the manually operable ring 219a must be absolutely avoided, and this leads to the poor holdability of the photo-taking lens barrel A. Also, if the values of $\Delta 6$ and $\Delta n$ are extremely great, accurate focusing will become impossible as previously described and thus, these values must be moderately great.

As described above, if the manual focusing operation is performed during the automatic focusing drive, the servo inhibition flag continues to be output as long as the manually operable ring 219a is rotated, that is, as long as the manual operation is performed, thereby stopping the driving of the drive motor 313. At a point of time whereat the manual focusing operation is terminated and the rotation of the manually operable ring 219a is stopped, change-over is effected so that the servo inhibition flag is not output, whereby the automatic focusing operation by the motor drive is resumed, and as soon as the rotation of the manually operable ring 219a is stopped, the motor drive is started. This leads to the occurrence of an inconvenience that the movement of the manually operable ring 219a cannot be stopped even for a moment during the manual operation. Therefore, the timing for stopping the outputting of the servo inhibition flag must be set to a predetermined time $\Delta t_1$ after the rotation of the manually operable ring 219a has been stopped. Although the value of $\Delta t_1$ may be fixed at a predetermined value, it is to be understood that the $\Delta t_1$ assumes an optimum value depending on the kind, the size and the photographing conditions of the photo-taking lens. Accordingly, the design may be such that the photographer can change the value of this $\Delta t_1$ by a change-over switch as desired. Also, in the program of the CPU 311 in the body, the design may be such that the motor drive is resumed in the predetermined time $\Delta t_1$ after a point of time at which the servo inhibition flag from the photo-taking lens barrel side has ceased to come.

When the automatic focusing lens barrel of the FIG. 5 embodiment has been mounted to a camera body which is not for automatic focusing or when such lens barrel has been mounted to the camera body B for automatic focusing shown in FIG. 6 and the coupling shaft 325 has been retracted to release the coupling (the manual focusing mode has been selected) the coupling shaft 237a of the barrel side becomes free. When in this state, the manually operable ring 219a is rotated for the manual focusing operation, only the internal gear cylinder 217 is rotated and the cam cylinder 213 is not rotated because the rotational torque of the internal gear cylinder 217 is generally smaller than the rotational torque of the cam cylinder 213, and accordingly, the movable lens L1 and L2 are not moved and the manual focusing operation cannot be performed.

So, in the embodiment of FIG. 5, the clamp screw 245 is screwed in during the manual focusing operation to thereby prevent rotation of the internal gear cylinder 217, thus enabling the focusing by the manual operation to be accomplished. Also, if a switch, not shown, which is operatively associated with the screwing-in of the clamp screw 245 is provided, it will be possible to supply a signal representative of the fact that the manual operation is taking place from the lens barrel side to the body side when the internal gear cylinder 217 is clamped.

The third embodiment has been described above with reference to FIGS. 5–7, but the present invention is not restricted to such embodiment. For example, the distance scale display has been accomplished by providing the distance scale cylinder 260 operatively associated with the cam cylinder 213, but the number of detectable positions may be increased within the encoder 255, whereby the rotated position of the cam cylinder 213, i.e., the photographing distance, can be known by means of the output code of the encoder 255. Accordingly, it is also possible to display the value thereof on the lens barrel side or on the body side by the use of a liquid crystal display element or the like. Also, in the above-described embodiment, detection of the limit of the movable lens L1 and L2 during the automatic focusing drive is accomplished by the brush 257 and encoder 255 provided in the cam cylinder 213, but this need not always be done. For example, if the manually operable ring 219 is allowed to be rotated by a slight amount when the movable lens L1 and L2 have arrived at the limit during the automatic focusing drive, detection of the limit can be accomplished also by the use of the output pulse of the photointerrupter 253.

That is, when the cam cylinder 213 has come to bear against a mechanical limitation and its rotation has been regulated thereby, if the drive motor 313 continues to revolve, the manually operable ring 219a will begin to rotate and therefore, if the rotation of the manually operable ring 219a is detected, it will be possible to know the arrival at the limit and stop the drive of the motor 313.

Also, in the third embodiment, there has been made of the problem arising when the movement amount combining means has combined the movement by the automatic focusing operation and the movement by the manual focusing operation, and there has further been described an example in which said movements have not been combined but alternatively selected (the drive of the motor 313 is stopped after the manually operable ring 219a has been operated), but the drive of the motor need not always be stopped even if the respective drives are combined. For example, when the manually operable ring 219a has been manually operated, the amount and direction of operation are electrically detected and the output pulse number of the photointerrupter 253 in the barrel is corrected on the basis of the detected amount of operation, whereby the correlation between the amount of movememt of the movable lens L1 and L2 and the output pulse of the photointerrupter 253 in the barrel is maintained and thus, accurate automatic focusing drive can be achieved even if the motor drive is not stopped during the manual operation.

As described above, according to the third embodiment of the present invention, the moved end of the movable optical system can be known by a moved end detection signal being produced and the manually operable ring can be prevented from being inadvertently rotated and therefore, the operability and holdability of the photo-taking lens are greatly improved.

Further, according to the third embodiment, where the design is such that when the manually operable ring has been operated, the output signal of the photointerrupter or the like electrically detecting the amount of motor drive is corrected by an amount corresponding to the amount of operation of the manually operable ring, the motor drive need not always be stopped during the manual operation. In the case of it is possible to add the amount of manual operation drive to the amount of motor drive and increase the movement speed of the movable optical system.

The first, second and third embodiments of the present invention have been described with respect to an interchangeable type lens barrel for automatic focusing mountable to a camera body for automatic focusing, but the present invention is not restricted thereto. It is also applicable to a lens barrel for automatic focusing having therein a drive motor for a photo-taking optical system or to a photo-taking lens having a mechanism such as power focus (a focusing device using the motor drive) or power zoom (a zooming device using the motor drive).

According to the first, second and third embodiments of the present invention, if the motor drive is stopped when the manually operable ring has been operated by the photographer, the movable optical system is moved by only the manual operation, and this leads to a good sense of touch of the manual operation (for example, the rotation between the amount of manual operation and the amount of movement of the image surface is constant) and the change-over between the manual operation and the motor drive can be accomplished without any special change-over operation, which means greatly improved operability.

Furthermore, according to the first, second and third embodiments of the present invention, by fixing the coupling shaft, good manual operation is possible even when the lens barrel is mounted to a camera body which is not for automatic focusing.

What is claimed is:

1. A photo-taking lens assembly having a lens moved along the optic axis thereof on the basis of a detection signal relating to the focusing state of a photo-taking optical system, said photo-taking lens assembly comprising:
    manually operable means for moving said lens;
    means for detecting an amount of the manual operation of said manually operable means and producing a drive output representing said amount of said manual operation; and
    drive control means including electrically driven output transmitting means and adapted to respond to said detection signal to drive said output transmitting means and move said lens when said drive output of said manually operable means is not produced, and to move said lens on the basis of an amount determined by the combination of said detection signal and said drive output when said drive output of said manually operable means is produced.

2. A photo-taking lens assembly having a movable lens movable along the optic axis thereof, said photo-taking lens assembly comprising:
    electric moving means including an electrically rotatable member electrically rotatively driven to move said movable lens;
    manual moving means including a manually operable member rotatable about the optic axis to move said movable lens;
    means for detecting said manually operable member having been rotated and outputting a detection signal; and
    means for inhibiting the operation of said electric moving means in response to the detection signal from said detecting means.

3. A photo-taking lens assembly according to claim 2, wherein said detecting means includes means for measuring an amount of the rotation of said manually operable member to generate said detection signal when said manually operable member is rotated by a predetermined amount.

4. A photo-taking lens assembly according to claim 3, wherein said measuring means generates said detection signal when said manually operable member is rotated by said predetermined amount within a predetermined time.

5. A photo-taking lens assembly according to claim 3, wherein said detecting means outputs said detection signal corresponding to an amount of the rotation of said manually operable member.

6. A photo-taking lens assembly according to claim 5, wherein said inhibiting means inhibits the operation of said electric moving means when said amount represented by said detection signal reaches a predetermined amount within a predetermined time.

7. A photo-taking lens assembly according to claim 5, wherein said inhibiting means removes the inhibition of the operation of said electric moving means after a predetermined time from the termination of the rotation of said manually operable member.

8. A photo-taking lens assembly according to claim 2, further comprising means for combining the amounts of movement of said movable lens by said electric moving means and said manual moving means during the operation of said electrically rotatable member and said manually operable member.

9. A photo-taking lens assembly according to claim 8, wherein said combining means includes a pair of gears and a planet gear meshing with said pair of gears and rotated while revolving about the optic axis, said planet gear is held for rotation and revolution by said manually operable member, and one of said pair of gears is operatively associated with said electrically rotatable member and rotates the other gear through said planet gear to thereby move said movable lens.

10. A photo-taking lens assembly according to claim 8, wherein said combining means includes a first cylinder member having first screw means and rotated about the optic axis in response to the rotation of said manually operable member, a second cylinder member holding said movable lens, having second screw means and rotated about the optic axis in response to the rotation of said electrically rotatable member, and a third cylinder member threadably engaged with said first screw means and said second screw means and rectilinearly movable in the direction of the optic axis.

11. A photo-taking lens assembly according to claim 2, further comprising means for outputting a signal when said movable lens arrives at a limit of the movement thereof in one direction and means for stopping the operation of said electric moving means moving said moving lens in said direction in response to said signal.

12. A photo-taking lens assembly having a movable lens movable along the optic axis thereof by the drive of a drive motor, said photo-taking lens assembly comprising: electric moving means including an electrically rotatable member electrically relatively driven to move said movable lens;
manual moving means including a manually operable member for moving said movable lens;
means for combining the amounts of movement of said movable lens by said electric moving means and said manual moving means during the operation of said electrically rotatable member and said manually operable member; and
friction-braking means for applying a friction force to said manually operable member to set the torque T1 necessary to operate said manually operable member and the torque T2 necessary to move said movable lens in the relation that T1>T2.

13. A photo-taking lens assembly according to claim 12, wherein said electric moving means includes clutch means provided between said electrically rotatable member and said drive motor, and rotation preventing means for preventing idle rotation of said electrically rotatable member when the connection between said electrically rotatable member and said drive motor is cut off by said clutch means.

14. A photo-taking lens assembly according to claim 12, wherein said combining means includes a differential mechanism for coupling said electric moving means and said manual moving means.

15. A photo-taking lens assembly according to claim 14, wherein said electrically rotatable member comprises a drive gear and wherein said differential mechanism includes a first gear formed integrally with a gear meshing with said drive gear and rotatable about the optic axis, a second gear having a cam for moving said movable lens along the optic axis and rotatable about the optic axis, and a planet gear rotatably supported on said manually operable member and meshing with both of said first gear and said second gear.

16. A photo-taking lens assembly according to claim 14, wherein said electrically rotatable member comprises a drive gear and wherein said differential mechanism includes a first cylinder member having first screw means and rotatable about the optic axis with said manually operable member, a gear cylinder holding said movable lens, having second screw means and meshing with said drive gear and rotatable about the optic axis, and a double helicoid cylinder threadably engaged with said first screw means and said second screw means and rectilinearly movable along the optic axis.

17. A photo-taking lens assembly having a movable lens movable along the optic axis thereof by the drive of a drive motor controlled on the basis of a focus detection signal relating to the focusing state of a photo-taking optical system, said photo-taking lens assembly comprising:
automatic moving means driven on the basis of said focus detection signal by said drive motor and moving said movable lens along the optic axis;
manual moving means including a manually operable member rotatable about the optic axis to move said movable lens along the optic axis by a manual operation;
means for detecting said manuallly operable member having been rotated and outputting a manual operation signal; and
means for inhibiting the operation of said automatic moving means in response to the manual operation signal from said detecting means.

18. A photo-taking lens assembly according to claim 17, wherein said detecting means includes means for measuring an amount of the rotation of said manually operable member to generate said manual operation sigal when said manually operable member is rotated by a predetermined amount.

19. A photo-taking lens assembly according to claim 18, wherein said measuring means generates said manual operation signal when said manually operable member is rotated by said predetermined amount within a predetermined time.

20. A photo-taking lens assembly according to claim 18, wherein said detecting means outputs said manual operation signal corresponding to an amount of the rotation of said manually operable member.

21. A photo-taking lens assembly according to claim 20, wherein said inhibiting means inhibits the operation of said automatic moving means when said amount represented by said manual operation signal reaches a predetermined amount within a predetermined time.

22. A photo-taking lens assembly according to claim 20, wherein said inhibiting means removes the inhibition of the operation of said automatic moving means after a predetermined time from the termination of the rotation of said manually operable member.

23. A photo-taking lens assembly according to claim 17, further comprising means for combining the amounts of movement of said movable lens by said automatic moving means and said manual moving means.

24. A photo-taking lens assembly according to claim 22, wherein said combining means includes a pair of gears and a planet gear meshing with said pair of gears and rotated while revolving about the optic axis, said planet gear is held for rotation and revolution by said manually operable member, and one of said pair of gears is operatively associated with said automatic moving means and rotates the other gear through said planet gear to thereby move said movable lens.

25. A photo-taking lens assembly according to claim 22, wherein said combining means includes a first cylinder member having first screw means and rotated about the optic axis in response to the operation of said manually operable member, a second cylinder member holding said movable lens, having second screw means and rotated about the optic axis in response to the rotation of said automatic moving means, and a third cylinder member threadably engaged with said first screw means and said second screw means and rectilinearly movable along the optic axis.

26. A photo-taking lens assembly according to claim 17, further comprising means for outputting a signal when said movable lens arrives at a limit of the movement thereof in one direction and means for stopping the operation of said automatic moving means moving said moving lens in said direction in response to said signal.

27. A photo-taking lens assembly having a movable lens moved along the optic axis thereof by the drive of a drive motor controlled on the basis of a detection signal relating to the focusing state of a photo-taking optical system, said photo-taking lens assembly comprising:
  automatic moving means including a drive gear driven by said drive motor and rotatable to move said movable lens along the optic axis;
  manual moving means including a manually operable member rotatable about the optic axis to move said movable lens along the optic axis by a manual operation;
  means for combining the amounts of movement of said movable lens by said automatic moving means and said manual moving means; and
  friction-braking means for applying a friction force to said manually operable member to set the torque T1 necessary to operate said manually operable member and the torque T2 necessary to move said movable lens in the direction that $T1 > T2$.

28. A photo-taking lens assembly according to claim 27, wherein said automatic moving means includes clutch means provided between said drive gear and said drive motor, and rotation preventing means for preventing idle rotation of said drive gear when the connection between said drive gear and said drive motor is cut off by said clutch means.

29. A photo-taking lens assembly according to claim 27, wherein said combining means includes a differential mechanism for coupling said automatic moving means and said manual moving means.

30. A photo-taking lens assembly according to claim 29, wherein said differential mechanism includes a first gear formed integrally with a gear meshing with said drive gear and rotatable about the optic axis, a second gear having a cam for moving said movable lens along the optic axis and rotatable about the optic axis, and a planet gear rotatably supported on said manually operable member and meshing with both of said first gear and said second gear.

31. A photo-taking lens assembly according to claim 27, wherein said differential mechanism includes a first cylinder member having first screw means and rotatable about the optic axis with said manually operable member, a gear cylinder holding said movable lens, having second screw means and meshing with said drive gear and rotatable about the optic axis, and a double helicoid cylinder threadably engaged with said first screw means and said second screw means and rectilinearly movable along the optic axis.

32. A photo-taking lens assembly capable of being mounted on a camera housing and having a movable lens moved along the optic axis thereof by the drive of a motor of said camera housing, said photo-taking lens assembly comprising:
  a rotating member electrically rotatively driven to move said movable lens;
  means for coupling said rotating member with said motor when said lens assembly is mounted on said camera housing;
  manual moving means including a manually operable member for moving said movable lens;
  means for combining the amounts of movement of said movable lens by said rotating member and said manual moving means during the operation of said rotating member and said manually operable member; and
  a clamp member operable for clamping said rotating member to prevent idle rotation thereof.

* * * * *